United States Patent

Mathews et al.

[11] 3,883,030
[45] May 13, 1975

[54] BREATHER CAP APPARATUS FOR A SPRING-ACTUATED BRAKE MECHANISM

[76] Inventors: George P. Mathews, 16947 Kinross Rd., Birmingham, Mich. 48009; Robert B. Hutter, 14180 Susanna, Livonia, Mich. 48154

[22] Filed: Jan. 15, 1973

[21] Appl. No.: 323,517

Related U.S. Application Data

[63] Continuation-in-part of Ser. No. 179,843, Sept. 13, 1971.

[52] U.S. Cl. ............... 220/204; 55/417; 137/513.5; 137/516.17; 137/525.3; 137/550; 220/375
[51] Int. Cl. ................ B65d 51/16; F16k 17/00
[58] Field of Search . 137/544, 550, 516.11, 516.17, 137/516.23, 513.5, 525, 525.3; 220/38.5, 44 R; 136/176, 177; 55/417

[56] References Cited
UNITED STATES PATENTS

| | | | |
|---|---|---|---|
| 2,370,451 | 2/1945 | Dank | 137/525 |
| 2,458,211 | 1/1949 | Scinta | 137/544 |
| 2,650,673 | 9/1953 | Bering et al. | 220/44 R |
| 2,786,091 | 3/1957 | Spellier | 220/44 R |
| 3,085,591 | 4/1963 | Schneider | 137/525.3 |
| 3,228,418 | 1/1966 | Rosback et al. | 137/516.17 |
| 3,497,104 | 2/1970 | White | 136/178 |
| 3,610,273 | 10/1971 | Russell | 137/525.3 |

*Primary Examiner*—William I. Price
*Assistant Examiner*—Allan N. Shoap

[57] ABSTRACT

Breather cap apparatus is disclosed for closing off the spring chamber of a brake mechanism of the emergency chamber type including a cap member having a ring thereon secured to the head tube of the spring chamber and sealing off the chamber in a fluid-tight manner. The apparatus includes filtered air flow means for permitting free breathing in one air flow direction and controlled air flow in the opposite direction. Means are further provided for selectively engaging and disengaging the cap member from fluid-tight connection with the chamber.

15 Claims, 5 Drawing Figures

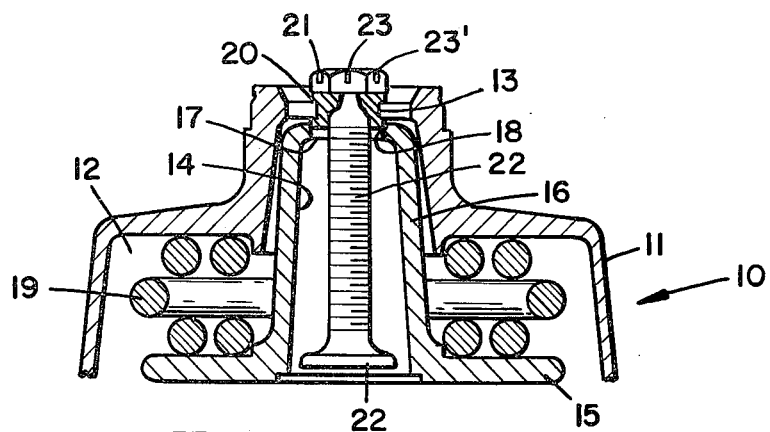
FIG_1
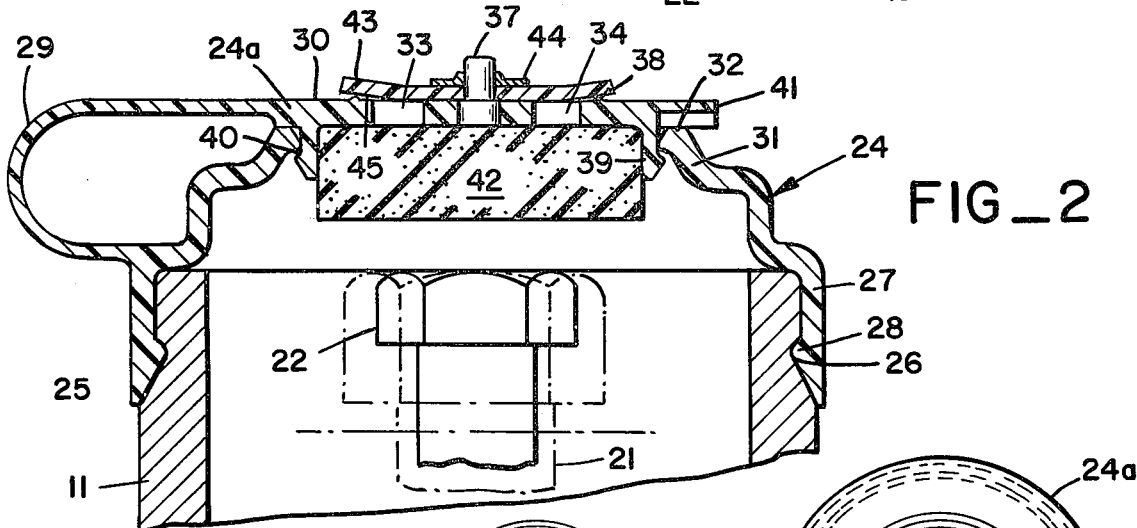
FIG_2
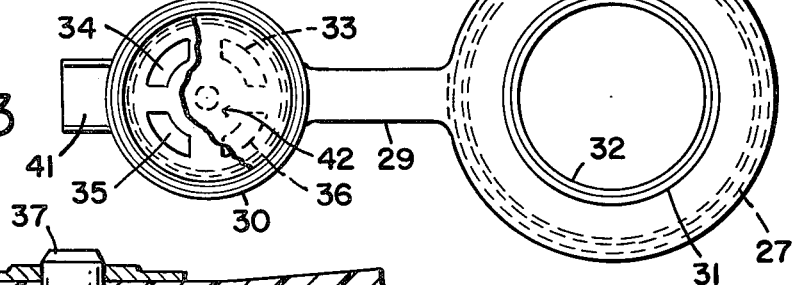
FIG_3
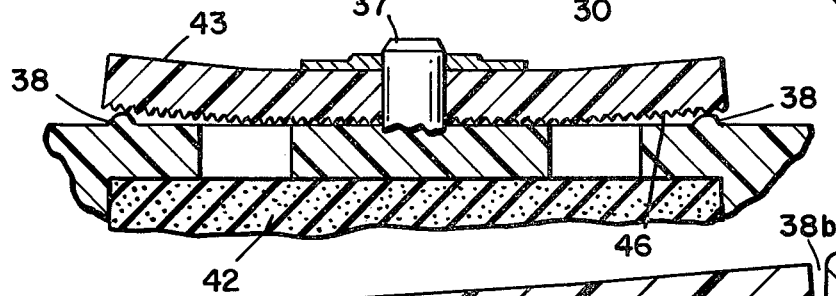
FIG_4
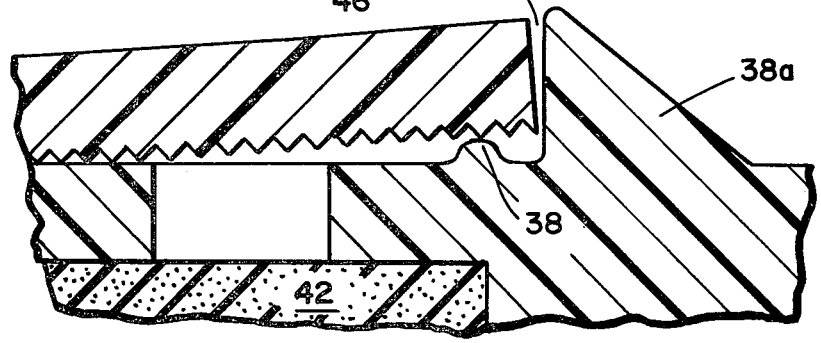
FIG_5

BREATHER CAP APPARATUS FOR A SPRING-ACTUATED BRAKE MECHANISM

RELATED APPLICATION

This application is a continuation-in-part of application Ser. No. 179,843, filed on Sept. 13, 1971, by George P. Mathews and Robert B. Hutter.

BACKGROUND OF THE INVENTION

1. Field of the Invention

The invention relates to brake mechanisms, and, more particularly, to brake mechanisms used in pneumatic brake systems which include a spring-powered brake chamber.

2. Description of the Prior Art

Heavy-duty brakes are normally equipped with pneumatic brake systems. Pressure from a master pressure source operates on a piston or diaphragm to move it and associated members to apply the brakes to the wheels through any well-known linkage. It is now conventional that an auxiliary or emergency braking system be provided which is actuated either in the event of a loss of pressure in the master pressure source or by driver-controlled means. The emergency system operates on the piston or diaphragm in place of the pressure normally derived from the master pressure source.

In such systems, for example, the brake mechanism described by Kateley in U.S. Pat. No. 3,112,959, it is often desirable to obtain access to a release bolt which extends axially through the spring chamber with the spring of the chamber surrounding the bolt. In certain systems, the top or head member of the spring chamber employs a breather cap that either holds or threads onto the head member and must be completely removed in order to obtain access to the release bolt. This raises certain problems in the shipping of such assemblies and field service work thereon. For example, in order to properly install such spring chambers on a chassis in the manufacturing process, the release bolt, in most cases, wants to be in a "brake-released" condition and, after axle assembly, must be screwed into the brake mechanism units. Breather caps are then shipped as a loose part and must be installed as a last operation. In order to perform field service work, mechanics must remove the current breather cap to get to the release bolt. Thus, persons not familiar with the unit must not only install such caps but do so in a correct manner that will make such caps and closures effective in protecting the units from contamination.

Thus, there is a need for breather cap apparatus for such brake mechanisms that requires less dependence on others and less skill to perform such operations, yet results in a unit as reliable or even more reliable than in the past. Finally, such apparatus should reduce the potential for contamination of the spring chamber as much as possible.

SUMMARY OF THE INVENTION

It is an object of this invention to provide an improved breather cap apparatus for the spring chamber of a brake mechanism of the emergency chamber type.

It is a further object of this invention to provide such a breather cap apparatus which requires relatively little skill to restore operation during field use.

It is still a further object of this invention to provide such a breather cap apparatus which reduces the potential for contamination of the spring chamber with which it is associated.

These and other objects are preferably accomplished by providing a breather cap apparatus closing off the spring chamber of a brake mechanism of the emergency chamber type which includes a cap member having a ring thereon secured to the head tube of the spring chamber and sealing off the chamber in a fluid-tight manner. The apparatus includes filtered air flow means including a valve therein for permitting free breathing in one air flow direction and controlled air flow in the opposite direction. Means are further provided for selectively engaging and disengaging the cap member from fluid-tight connection with the chamber. In this manner, apparatus is disclosed which requires less dependence on others, less skill to operate, is more reliable and reduces contamination by providing a controlled rate of air flow into the spring chamber. Further, such apparatus limits the possibility of ice or mud formation preventing the valve thereof from opening and performing its free flow function and further cracks off any ice or mud tending to block opening of the valve and restrict contamination of the brake mechanism.

BRIEF DESCRIPTION OF THE DRAWINGS

FIG. 1 is a vertical sectional view of a portion of a pneumatically operated brake mechanism of the emergency chamber type having a spring chamber therein;

FIG. 2 is a detailed view of the mechanism of FIG. 1 showing the head member thereof with the breather cap apparatus of our invention mounted thereon;

FIG. 3 is a plan view of the breather cap of our invention;

FIG. 4 is a detailed view of a portion of the mechanism of FIG. 2; and

FIG. 5 is a detailed view similar to FIG. 4, showing a modification of the breather cap apparatus of our invention.

DESCRIPTION OF THE PREFERRED EMBODIMENT

Referring now to FIG. 1 of the drawings, a portion of a conventional brake mechanism is generally referred to by the reference numeral 10 and is basically cylindrical. The mechanism 10 includes an emergency housing 11 and the various emergency and service chambers (not shown) are below an upper spring actuating chamber 12. The emergency housing 11 defines an emergency housing aperture 13. These emergency and service chambers may be either diaphragm or piston operated, as discussed hereinabove with respect to prior art devices. Thus, our invention is adaptable to any brake mechanism of the emergency chamber type which includes an upper actuating spring chamber, as will now be described.

Actuating chamber 12 includes a piston 14 therein which is comprised of a push or bearing plate 15, which may be in contact with an emergency diaphragm or the like (not shown). Bearing plate 15 includes an upstanding pilot boss in the form of a tubular sleeve 16 integral therewith extending axially to emergency housing 11. Tubular sleeve 16 is provided with shoulder portion 17 which defines sleeve aperture 18. Actuating spring 19 is mounted axially about tubular sleeve 16 and extends from emergency housing 11 to bearing plate 15, as shown.

A flanged bushing 20 is seated in emergency housing aperture 13 and contains a vent therein (not shown). Threaded member 22 is axially mounted and extends from the exterior of actuating chamber 12 in threaded engagement through flanged bushing 20, sleeve aperture 18, and into tubular sleeve 16. A hexagonal nut 21 is threadably mounted on its exterior end. Nut 21 contains passage 23 which, when aligned with passage 23' of threaded member 22, allows the insertion of a locking pin therein (not shown). Nut 21 is thus fixed and cannot rotate on threaded member 22 unless the locking pin is removed. Dirt may be kept out of the assembly by a breather cap and a foam filter, as will be described further hereinbelow.

A cap 22a may be integrally provided at the other end of threaded member 22.

Although a particular type of release bolt and piston arrangement has been described, the bolt or member 22 may be any suitable type and merely must be releasable to provide access to the interior of mechanism 10. Such release bolt arrangements in brake mechanisms of the spring-actuated type are well known in the art and the techniques of our invention are adaptable to all such types.

For example, in the particular embodiment illustrated, the arrangement of piston 14 shown in FIG. 1 in the chamber 12 is such that, when piston 14 is reciprocated, the action between the inner adjacent portion of the inner wall of housing 11 and the outer surface of the sleeve of piston 14, as well as bolt 22 and aperture 13 and the inner surface of piston 14 and housing 11, acts as guide means for the piston 14. That is, during reciprocation of piston 14 upon actuation of spring 19, there is a restriction against excessive tilting or lateral movement of the bearing plate 15 of piston 14 in the chamber 12 of the housing 11.

The upper position of emergency housing 11 is shown as open in FIG. 1. Generally, such housings are closed off by suitable breather caps which seal off the interior of the brake mechanism from dirt or the like while permitting a certain amount of air flow therethrough.

Referring now to FIG. 2, the upper portion of brake mechanism 10 is shown having breather cap apparatus 24 installed thereon in accordance with our invention. Thus, emergency housing 11 includes a generally cylindrical head portion 25 having an outer circumferential groove 26. Groove 26 is preferably chamfered and undercut, as shown. Breather cap apparatus 24 includes a cap portion 24a having a ring portion 27 (FIG. 3) with an internal bead 28 or the like arranged to fit tightly into groove 26 of head portion 25 (FIG. 2). This bead (28) — groove (26) arrangement affords a positive lock and the material of ring portion 27, which may be of a suitable resilient material such as polyethylene, is stretched to grip the outer diameter of the head portion 25 of housing 11. Thus, a secure, airtight, resilient attachment of breather cap 24a to head portion 25 is obtained.

Ring portion 27 further includes a strap 29 interconnecting portion 27 to a preferably disc-shaped cover portion 30 (FIG. 3). Strap 29 acts as a hinge to permit independent movement of cover portion 30 (see also FIG. 2). Ring portion 27 includes an inner circumferential upstanding dished portion 31 (FIG. 2) terminating in a beaded edge 32 and of a diameter sufficient to receive cover portion 30, as will be explained shortly. This diameter is further sized to permit entry of a suitable tool, such as a socket wrench or the like, to engage the nut 22 of release bolt 21 (FIG. 1).

Cover portion 30 includes a plurality of spaced apertures 33 through 36 (FIG. 3) arranged about an integral upstanding central pin 37 (FIG. 2) and within a minor, raised, beaded ring 38 on the outer portion of cover portion 30. The inner portion of cover portion 30 includes a downwardly extending ring extension portion 39 having an undercut groove 40 on its outer diameter to provide an interference fit with the cooperating beaded edge 32 of ring portion 27 so as to provide a positive retaining means that is airtight.

A pull tab 41 is integrally connected to the outer edge of cover portion 30 for peeling cover portion 30 out of engagement with ring portion 27. Strap 29 prevents the separation of portions 27 and 30. Thus, whenever release bolt 21 must be operated, access thereto is easily and quickly obtained without tools, the closing member for cap 11 cannot be misplaced and the need to reclose the access hole to bolt 20 is readily visible to a mechanic or an assembly line worker or inspector.

A preferably round, flat, resilient valve 43, such as one of rubber or the like, is installed on pin 37 (FIG. 2). Valve 43 is imperforate except, of course, for its central hole. Valve 43 is retained in position by means of a suitable fastener, such as conventional push-clinch type fastener 44. The valve 43, when installed in the FIG. 2 position, covers the apertures 33 through 36 and the beaded ring 38, this ring 38 deflecting valve 43 upwardly at its outer circumferential edge (FIG. 4) to provide a minor preload or spring load to thereby obtain a positive valve (43) — bead ring (38) contact and a normally closed air valve.

The underside 45 of valve 43 is preferably scored or textured, as shown by score means 46 in FIG. 4, with a preselected amount of roughness to prevent a perfect seal between bead ring 38 and valve 43 and thus provides a selectively controlled amount of minor air leakage. Alternatively, the surface of bead ring 38 which contacts the underside 45 of valve 43 may be so scored or textured (not shown).

A generally round filter 42 is preferably secured within the disc-shaped cover portion 30 between the downwardly extending ring extension portion 39 as shown in FIG. 2. Filter 42 is preferably of a foam material and secured to the underside of portion 30 by any suitable adhesive material.

It can be seen from the foregoing that our breather cap apparatus 24 provides closure for spring chamber 12. In operation, the breather cap apparatus 24 is a semi-permanent installation and need not be removed except when the brake mechanism 10 is to be completely disassembled, such as when replacing spring 19. The brake mechanisms 10 can be shipped with the ring portion 27 assembled on the head portion 25 and the bolt access opening of FIG. 2 closed or open. In either case, the means for closing the opening to chamber 12 is integrally attached and cannot be lost or overlooked easily. Failure to close the access hole can be corrected at any time because the closing means is attached and readily visible.

Brake mechanisms shipped with the breather cap apparatus 24 installed will be protected from contamination during transit and storage, and may be easily opened for work on the release bolt 21 at vehicle assembly and then closed.

The breather cap closure is also leak-proof since it is made by an interference fit and the cap 24a is made from a resilient material. The use of cooperating chamfers at the bead (28) — groove (26) and access hole-closure points (32, 39, 40) permit easy assembly and installation despite the interference fits at both points. The peel-out action afforded by the lifting tab 41 ensures an easy removal of the hole closure while the mechanical lock and interference prevents removal of ring 27 or cap 24a in other manners — such as directly upwardly.

The breather valve 43 is essentially a one-way check valve with a controlled rate of flow into the mechanism 10. When spring hold-off air is applied to the spring-powered piston 14 therein (FIG. 1), it will stroke upward, decreasing the space volume and increasing the pressure of the air above the piston 14. This lifts the valve off its beaded seat and air flows freely out of the mechanism 10 through the multiple apertures 33–36 to the atmosphere. The built-in deflection of the valve 43 causes it to close at approximately 1 psi pressure differential — that is, atmospheric pressure outside vs. atmospheric plus 1 psi pressure inside the chamber 12. This pressure differential reduces to zero after the valve 43 seats because of the minor leakage built into the valve 43 and seat (all as discussed hereinabove).

When the hold-off pressure is removed, the spring 19 drives the piston 14 downwardly, increasing the space volume and decreasing the pressure above the piston 14. This action draws a vacuum or a reverse pressure differential — atmospheric pressure outside vs. some lesser pressure value inside. This differential acts to force the valve 43 against its seat and aids in sealing. However, the roughness or texture on the valve or its beaded seat prevents a perfect seal and permits air to flow through the resultant fine openings to relieve the pressure differential and the vacuum.

The openings are so fine in size and so large in number that they act as effective filters to bar entry of significantly sized dust or salt particles or water drops. Water vapor would not be excluded. The openings are selected to permit a controlled leakage of between 0.5 and 10 psi per minute.

The rate of controlled leakage is selective, depending on the value of the vacuum. Drawing a vacuum results in a reduction in the output force of the spring 19. This loss of output force is equal to the pressure differential value developed times the piston hold-off area. The result is a force acting to oppose the spring force and the vector sum is an output force less than what a free-breathing or zero differential unit would produce. The amount of differential developed is a function of stroke and volume change. Small-stroke, small-diameter brake mechanisms may suffer so little loss that a no-flow, no-leak seal may be used which would result in absolutely no chance for contamination.

However, it may not be possible to accept the force loss in long-stroke, large-diameter brake mechanisms and controlled-leak design must be used. For these reasons, it is desirable to have a selective leak rate. The variable leak rate may be obtained by texturing the valve, the valve seat, or both.

It can be seen from the foregoing that we have described a breather cap apparatus for closing off the spring chamber of a brake mechanism which requires less dependence on other people, less skill to work with and results in a more reliable closure. In addition, it reduces the potential for contamination of such chambers by providing a controlled rate of air flow therein.

Referring now to FIG. 5 wherein like numerals refer to like parts of FIG. 4, the cover portion 30 of cap portion 24a may include an upstanding ring 38a thereon. Ring 38a preferably terminates at its upper portion in a sharp, fine edge which acts to localize the fracture point (indicated by reference numeral 38b) of any encrusted ice or mud around and on top of the valve 43. Such a crust of ice, mud or the like will be thickest at any depression, as shown by 38b, and thinnest at any upstanding edge (e.g., the edge of ring 38a).

Further, ring 38a, as shown, tapers from a wide base to a sharp point that terminates at or just below the top edge of the valve 43 and is diametrically sized to provide about 0.020 inch clearance with the valve diameter. All of this is intended to develop a minimum thickness of any build-up of ice or caked mud at the outer diameter edge of the valve 43. Such build-up would block the valve 43 and prevent the flow of air into or out of the mechanism 10. Having a minimum crust thickness at this part of the valve 43 is very desirable.

Further, this control over where the thinnest part of the crust is located controls the fracture line of the crust. The crust must be cracked or broken to permit the valve 43 to open. Even if the crack is only 10° or 20° of circumferential length, this would be enough to obtain air flow. The force to cause the valve 43 to break the crust develops from any pressure differential value that is positive to the inside of the mechanism 10 and the amount of area that the valve 43 presents to this pressure. Since any valve force developed in the vicinity of the fastener 44 is absorbed by it or is ineffective in deflecting the valve 43, it is desired that the air passages 33–36 be located outwardly from the pin 37. The objective is (1) to maximize the force by air passages of large area and (2) to localize the force by having relatively thin, long slots. All of this relates to developing a maximum amount of force on the valve 43 to crack off ice or caked dirt and locating such forces at the most effective point on the valve 43. The small clearance between the guard ring 38a and the valve diameter is to also provide a cleaning action since a given volume of air flowing out around the valve 43 will, in a small space, travel faster (jet-like), lift the valve 43 more to obtain a flow area causing more valve deflection and thereby crack off the initial build-up of crusted material on top and around the edge of the valve 43. The ring 38a thus promotes maximum air velocity and maximum valve deflection.

In summary, we have disclosed a unique arrangement wherein a breather cap apparatus closes off the top of a brake mechanism unit in a manner wherein a mechanical lock is formed to retain the respective parts in position on the unit, an airtight or leak-proof connection between the respective parts is provided and a secure engagement takes place so that when the filtered breather valve is encrusted with ice or hardened mud, inside air pressure cannot escape and the respective parts will not be blown out of engagement from any of the cooperating parts. Such action would impose an upward force on the parts and requires disengagement on the entire circumferential length of engagement. Finally, an engagement is provided that permits easy removal only when a localized peel-out force is employed.

The resilient, deflected valve includes means for limiting the possibility of ice or mud preventing the valve from opening and performing its free flow function and means to crack off ice or mud tending to block opening of the valve and means to restrict contamination of the brake chamber. Such means are, respectively, an enclosing wall around the valve which localizes the fracture line, apertures sized and spaced to maximize lifting force on the valve and a filter element cooperating with a controlled, minor leak facility when the valve is closed. These means are unique in their teachings of the effect of a vacuum in a spring-applied brake actuator and the utility of a minor leak in preventing spring force loss and minimizing contamination.

It can be seen from the foregoing that the two modifications of breather cap apparatus provide many unique and novel functions. These functions include, but are not necessarily limited to:

1. Positive retention to the actuator within the brake mechanism and the apparatus to prevent loss from blow-out pressures and road vibration;
2. Easy removal of the cover portion from the ring portion for access to a release bolt;
3. A filtered valve which provides free flow in one direction and controlled, selective flow in an opposite direction;
4. Deflective or spring loading of the valve to be normally closed;
5. A ring entry hole selectively accepting a valve-supporting element and a tool to actuate a release mechanism;
6. A strap connecting a ring and a valve-supporting element preventing loss of the top closure portion of the apparatus;
7. A valve or a valve seat that is textured or roughened in a selective manner to provide a controlled rate of leakage;
8. A valve-enclosing ring to promote a minimum build-up of encrustment so as to increase the possibility of the valve opening when urged by interior pressure against the resistance of such encrustment; and
9. Air passages in a disc under a loaded, normally closed valve, the passages being spaced and located diametrically and sized to develop a maximum opening force on the valve, the force being localized on the valve so as to promote fracture of any encrustment blocking deflective opening of the valve.

We claim as our invention:

1. Breather cap apparatus for closing off from the atmosphere the spring chamber of a brake mechanism comprising:
    a cap member comprised of a ring-shaped portion and a disc-shaped portion integrally connected;
    said ring-shaped portion including airtight means thereon for connecting said member to said spring chamber;
    said disc-shaped portion including leakproof means thereon for coupling said disc-shaped portion to said ring-shaped portion in a manner selectively sealing off the interior of said spring chamber from the atmosphere;
    air flow means associated with said disc-shaped portion for permitting free breathing in one air flow direction, from the interior of said spring chamber to said atmosphere, said air flow means including a plurality of spaced apertures in said disc-shaped portion and a resilient valve operatively connected to said disc-shaped portion, said valve closing off said apertures when seated in position on said disc-shaped portion, said disc-shaped portion including a raised, beaded ring thereon outside of said spaced apertures with said valve being sprung against said beaded ring to thereby be in a normally closed position; and
    said valve including means thereon at least at the point of contact with said beaded ring to prevent a perfect airtight seal between said beaded ring and said valve and permit a selectively controlled amount of air leakage therepast.

2. The apparatus of claim 1 wherein said air flow means includes a filter associated therewith and disposed between said disc-shape portion and the interior of said spring chamber.

3. The apparatus of claim 1 wherein said disc-shaped portion includes an upstanding circumferential ring thereon, said circumferential ring encircling the valve and spaced therefrom and terminating in a generally sharp tapered edge at its uppermost point.

4. The apparatus of claim 3 wherein said circumferential ring tapers upwardly from its widest portion at its junction with said disc-shaped portion to said tapered edge.

5. The apparatus of claim 4 wherein said tapered edge is spaced about 0.02 inch from said valve and terminates at a point approximately even with the uppermost portion of said valve.

6. The apparatus of claim 1 wherein said disc-shaped portion includes a centrally located upstanding pin, said apertures being circumferentially spaced about said pin and said valve having an aperture therein for receiving the pin of said disc-shaped portion and said disc-shaped portion having means to spring said valve to a normally closed position.

7. The apparatus of claim 6 wherein said valve is generally flat and imperforate.

8. The apparatus of claim 1 wherein said disc-shaped portion is integrally connected to said ring-shaped portion by a resilient hinge member, said disc-shaped portion including a tab member for grasping said disc-shaped portion to bend it about said hinge member and couple it to said ring-shaped portion.

9. The apparatus of claim 1 wherein said ring-shaped portion is resilient and includes a bead member adapted to snap-fit into a circumferential groove onto said brake mechanism and an upstanding circumferential dish-shaped portion adapted to receive said disc-shaped portion in a fluid-tight manner.

10. The apparatus of claim 9 wherein said dish-shaped portion has a beaded edge at the upper end and said disc-shaped portion includes a downwardly ring-shaped extension portion having an undercut groove on its outer diameter for providing an interference fit with the beaded edge of said dish-shaped portion.

11. The apparatus of claim 9 wherein said dish-shaped portion has a beaded edge at the upper end and said disc-shaped portion includes a downwardly ring-shaped extension portion having an undercut groove on its outer diameter for providing an interference fit with a beaded edge of said dish-shaped portion, and wherein a generally round filter is secured to the underside of said disc-shaped portion extending about the inner periphery of said ring-shaped extension portion when said disc-shaped portion is coupled to said ring-shaped portion.

12. The apparatus of claim 11 wherein said filter is comprised of a foam material.

13. The apparatus of claim 9 wherein said dish-shaped portion includes a centrally located aperture therein for receiving said disc-shaped portion, said aperture having a central axis generally coincident with the central axis of said brake mechanism.

14. Breather cap apparatus for closing off from the atmosphere the spring chamber of a brake mechanism comprising:
   a cap member comprised of a ring-shaped portion and a disc-shaped portion integrally connected;
   said ring-shaped portion including airtight means thereon for connecting said member to said spring chamber;
   said disc-shaped portion including leakproof means thereon for coupling said disc-shaped portion to said ring-shaped portion in a manner selectively sealing off the interior of said spring chamber from the atmosphere; and
   air flow means associated with said disc-shaped portion for permitting free breathing in one air flow direction from the interior of said spring chamber to said atmosphere, said air flow means including a plurality of spaced apertures in said disc-shaped portion and a resilient valve operatively connected to said disc-shaped portion, said valve closing off said apertures when seated in position on said disc-shaped portion, and said disc-shaped portion including an upstanding circumferential ring thereon, said circumferential ring encircling the valve and spaced therefrom and terminating in a generally sharp tapered edge at its uppermost point, said circumferential ring tapering upwardly from its widest portion at its junction with said disc-shaped portion to said tapered edge.

15. The apparatus of claim 14 wherein said tapered edge is spaced about 0.02 inch from said valve and terminates at a point approximately even with the uppermost portion of said valve.

* * * * *